Sept. 21, 1965 D. M. GOODMAN 3,207,945

INDEXING SYSTEM FOR COLOR CATHODE RAY TUBES

Original Filed March 20, 1959 2 Sheets-Sheet 1

INVENTOR.
David M. Goodman
BY
Hane & Nydick
ATTORNEYS

Sept. 21, 1965 D. M. GOODMAN 3,207,945

INDEXING SYSTEM FOR COLOR CATHODE RAY TUBES

Original Filed March 20, 1959 2 Sheets-Sheet 2

INVENTOR.
David M. Goodman
BY
Hane & Nydick
ATTORNEYS

United States Patent Office 3,207,945

Patented Sept. 21, 1965

3,207,945

INDEXING SYSTEM FOR COLOR CATHODE RAY TUBES

David M. Goodman, 3843 Debra Court, Seaford, N.Y.

Original application Mar. 20, 1959, Ser. No. 800,854, now Patent No. 3,081,414, dated Mar. 12, 1963. Divided and this application Dec. 29, 1961, Ser. No. 163,122
13 Claims. (Cl. 315—22)

This invention provides terminal equipment for color television systems so as to make more certain the color "purity" and the color "registration" of an image produced by a kinescope, and which simultaneously allows for moderate distortions of the produced image. It is a division of my pending application Serial #800,854 filed March 20, 1959, now Patent No. 3,081,414.

This invention also provides a system for efficiently utilizing (1) the scanned area of a cathode ray tube and (2) the emission current of the C.R.T. gun.

The foregoing objectives are accomplished by generating index signals which indicate the position of the electron beam on the target screen of the C.R.T.; filtering, detecting, and amplifying these index signals; and operating upon them to yield a train of electrical pulses that are used for gating the signals which bear the information that is desired to be displayed.

The fundamental concept of this invention resides in pulsing the synchronized electron beam of the C.R.T. for a period of time less than that required for the beam to traverse a color strip. By so doing, the remainder of the time used by the beam in crossing a strip is used to insure color purity. It will be shown how this feature, coupled with variable width strips, permits a high use factor of the target screen. Synchronization is obtained in the preferred embodiment, by using fast-acting, rapidly decaying electromagnetic index signals in conjunction with a minimum number of broadband modulation circuits so that the over-all time delay is reduced in the synchronization loop.

A fuller understanding of this invention and the objects and advantages thereof will become more apparent from the following detailed description thereof taken in connection with the accompanying drawing wherein.

Figure 1:
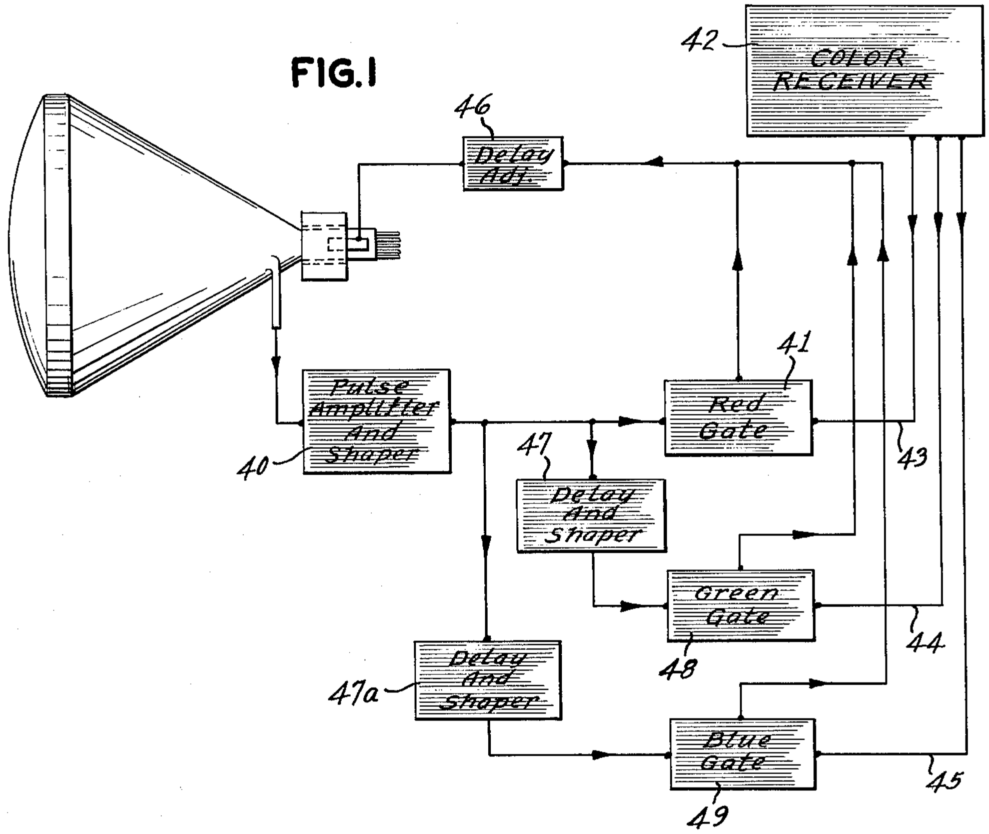
FIG. 1 is a block diagram of an embodiment of this invention.
Figure 2:
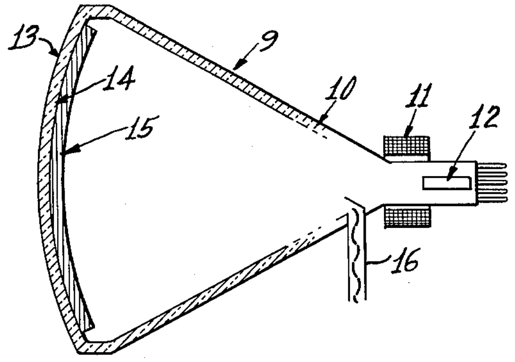
FIG. 2 is a sectional view of the C.R.T. forming a component of the system illustrated in FIG. 1.

In the drawing, the C.R.T. 9 comprises the cathode ray tube envelope 10, a pair of deflection coils 11, and a single gun 12. The viewed end of the C.R.T. is 13. On the inside surface 14 thereof is a phosphor coating 15 which will be described. A "detector" 16 is located within the tube as shown, or it may be disposed in concentric fashion with respect to deflection coils 11 (or other suitable deflection means) and the gun structure 12; or in any other suitable disposition that does not interfere with the flow of the electron stream from gun 12 to phosphor face 14 and is not excessively affected by fields associated with the deflection system.

Figure 3:
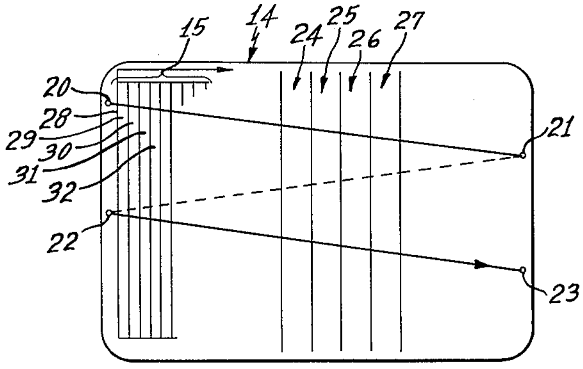
FIG. 3 is a partially expanded illustration of the phosphor screen on the viewed face of the C.R.T. illustrated in FIG. 2.

As shown in FIG. 3, the phosphor screen 15 positioned on the inside surface 14 of the kinescope 9, comprises a plurality of individual phosphor strips. A typical television receiver raster deflection is also illustrated, on a magnified scale for clarity, that scans from 20 to 21, that flies back from 21 to 22, that resweeps from 22 to 23, with subsequent repetitions of the scanning cycle. The phosphor strips that constitute 15, are arranged vertically with respect to the normal raster, and are shown on enlarged scales for clarity.

In accordance with known techniques, a colored image is developed from three primary colors, e.g., red, green, and blue, presented in proper relationship and magnitude. This is accomplished by appropriate components of screen 15, to wit: phosphor strip 24, the red; strip 25, the green; strip 26, the blue; strip 27, the red again, etc. The composition and the particle sizes of the phosphors to produce the desired colors, the width and spacing of the individual phosphors and other factors are in accordance with known techniques.

In this invention, however, strips of selected color as for example the red, have in registration therewith a special phosphor that emits radiation in the invisible portion of the spectrum. Accordingly, when the electron beam in its sweep or scan across the face, as from position 20 to 21, etc., hits phosphor strips 24, the invisible radiation emitted by the special phosphor component is detected by pick-up 16. This signal may be used as shown in FIG. 1. The special phosphor component in registration with the red strips radiates in the invisible portion of the spectrum so that the detector 16 is responsive to this activation and so that it does not interfere with the image. It is of the rapid decay type i.e. with an appropriate decay time constant, as of the order of $10^{-7}$ seconds. It is efficient in that it emits adequate numbers of photons under excitation of the electron stream; and saturates so that the number of photons emitted becomes independent of the number of electrons striking the phosphor, or in combination with detector 16 saturates so that the output pulse is independent of the gun current. A typical phosphor which may be used as the special phosphor component for this purpose is hex·ZnO.

Another form of C.R.T. in accordance with this invention is one wherein an aluminum screen is deposited on the regular luminescent screen as is now done to increase the visible light output of the kinescope by reflection of the image towards the observer, and the special phosphor is deposited on the gun side of the aluminum screen. The radiant energy emitted by the special phosphor is reflected by the aluminum screen to the detector 16.

The detector 16 is responsive to invisible radiation. Since the hex.ZnO emits radiation of approximately 3700 angstroms, detector 16 is selected which is responsive thereto. The combination of any special phosphor and appropriately responsive detector will mutually accept and singly reject signal transfer. To assist in the selection process an "optical" filter may be placed between the special phosphor and the detector which will pass only the radiation emitted by the special phosphor. An example of a detector which may be used is the RCA multiplier phototube 931-A.

In operation the system functions as follows: At the start of the raster, shown as position or point 20 on FIG. 3, there is no excitation of any phosphor. As the sweep progresses from left to right, the gun stream strikes edge 28 of the first phosphor strip 29 (a counterpart of 24). Strip 29 is in registration with the special phosphor. The coincidence of the electron stream fired by the gun and the edge 28 of strip 29, resulting in the emission of radiation by the special phosphor, is detected and amplified by pick-up 16, further amplified by pulse amplifier 40, and the resultant pulse opens the red information gate 41 of color receiver 42, which supplies the video information in three channels, 43, 44 and 45. This pulse will exist for "$t$" microseconds, depending upon the number of vertical strips in the kinescope, which in turn is correlated to the horizontal resolution of the system. Since a finite time elapses between the excitation of the special phosphor and the arrival of the pulse created thereby at the color gate 41, as well as to the kinescope gun 12, an additional delay 46, is provided which further delays the release of the "red" electron stream until the next or succeeding red phosphor strip 32 is reached by the electron stream. Phosphor strip 32 is "red," and is in registration with the special phosphor, so that the process described is repeated. This process continues across the face of the kinescope. Phosphor strips 30, and 31, simulate the green and blue strips.

In an alternative system there may be utilized a second pre-registration strip, akin to 29, and positioned to the left of 29 by the three strip distance, whereby a larger overall delay is inserted in the process described.

As has been explained, the red video signal is gated at a rapid rate and in synchronism with the red phosphor strips on the face of the C.R.T. Since a green phosphor strip is, as shown, to be energized after each red strip, the detected and amplified signal originating from the special phosphor component of the red strip is delayed for an interval of $t$ microseconds, the time it takes for the pulse to travel across the red strip; green gate 48, accordingly, opens at precisely the time that the electron stream strikes the leading edge of the green phosphor strip. This green gate also opens for an interval of $t$ microseconds following which blue gate 49 opens, for an interval of $t$ microseconds since the output of pulse amplifier 40 is delayed by an interval of $2t$ in 47*a* before feeding the pulse to the blue gate 49. The pulse to the blue gate 49, may alternatively be obtained by delaying the output of delay 47 by an additional time $t$ microseconds.

Delays 46, 47, and 47*a* can be provided, as is well known, by delay lines or blocking oscillators or multivibrators, etc.

The foregoing describes means by which color "registration" is achieved by this invention.

Figure 4:
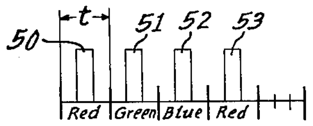
FIG. 4 is a diagrammatic representation, on a time scale, of the positions of pulses (ideally shaped) in a correctly registered raster being swept at a linear rate.
Figure 5:
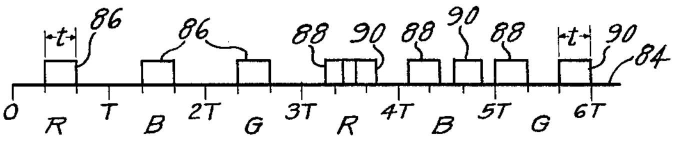
FIG. 5 is a diagrammatic representation, on a time scale akin to FIG. 4, of pulse positions in a correctly registered raster being swept at a linear and non-linear rate.

Color "purity" is achieved as follows: As shown in FIG. 4, the special phosphor signal, as described, is shaped to exist for an interval of $t/3$ (one-third of the interval $t$), as by electronic means. With an ideally linear sweep, this pulse, and subsequent pulses 51, 52, and 53, follow in time sequences whereby the video color signals are centrally aligned with respect to the color producing phosphor strips. In FIG. 5 the effects of a non-linear sweep are illustrated.

In FIG. 5 a base line 84 may be considered to represent distance along the target screen of FIG. 3 in the direction of the horizontal scan. Pulses 86, 88, and 90 represent in an ideal fashion, akin to FIG. 4, the excitation of the scanning beam on a target screen. The pulses may be derived from arrangements such as just described. The intervals from 0 to 6T represent equal time periods. The intervals also represent the widths of the color phosphor strips as shown. When the scanning beam traverses the screen with constant velocity from 0 to 3T the pulses 86 are equally spaced and preferably centered in each interval of space. When the scanning velocity is not constant, or when the pulse delays introduce error, as shown from 3T to 6T, the pulses 86 are advanced to the positions shown by pulse 90, or retarded to the position shown by pulse 88. The pulse width is shown equal to "$t$" which in this case is approximately $T/3$. The non-linearity illustrated is $T/3$ for each time period 3T. The errors resulting from non-linearity of scan are cumulative for the time between successive indexing pulses. Therefore the pulse first derived from the indexing pulse is shown to have a small shift between 3T and 4T, the second derived pulse is shown to have a larger shift between 5T and 6T.

Figure 6:
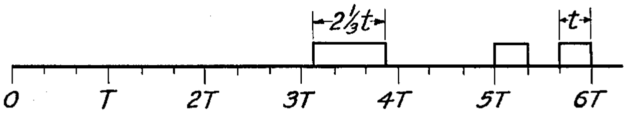
FIG. 6 represents another idealized excitation of the target screen of FIG. 3 by the electron beam wherein pulses of different size or duration are used.

The illustration in FIGURE 6 teaches how the pulse first derived from the indexing pulse may be made of greater duration than the pulse last derived while still maintaining color purity. This is due to the fact that the accumulated errors of scan position are much less for the first derived pulse. For the example cited the excitation period may be increased from $t$ to $2\frac{1}{3}t$. Since the red phosphor is least efficient it is clear that doubling the excitation period of this strip is of considerable consequence; and this is achieved without increasing the width of the red strip.

Figure 7:
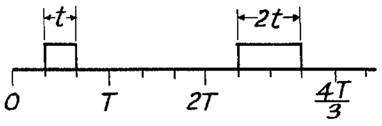
FIG. 7 represents still another idealized excitation of a target screen, with the last strip being of increased dimension and the pulses being of different size or duration.

The illustration in FIGURE 7 teaches still another method of improved utilization of variable pulse and phosphor widths and spacings. Here it is clearly shown that by increasing the width by 33% of the strip which is excitated by the pulse last derived from the index pulse it is possible to increase the period of excitation of that strip by 100% and still preserve color purity.

Figure 8:
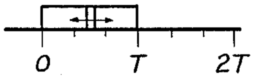
FIG. 8 represents the idealized excitation of one strip of a target screen wherein the period of excitation is modulated in time as a function of amplitude of the signal to be displayed.

The illustration in FIGURE 8 shows that the duration of the target excitation pulse may be modulated within the interval 0 to $T$, making it possible to use a constant intensity scanning beam. Each color video signal modulates the duration of the beam within each respective color strip so that the duration of excitation is proportional to the magnitude of the information to be presented. The use of a constant intensity scanning beam is of considerable value in maintaining uniform focus and spot size of the beam. Clearly a combination of intensity modulation and duration modulation of the beam may also be used to advantage.

Figure 9:
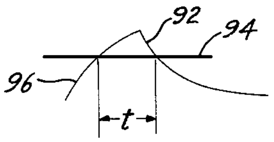
FIG. 9 represents an electrical pulse signal with exponential-like rise and decay.

The pulse shapes illustrated in FIGURES 4, 5, 6, 7, and 8 are rectangular. These pulses represent the idealized excitation of the target screen. In practice distortion of the idealized excitation is to be expected. The passage of a rectangular pulse through delay lines, gates, transmission lines, etc. can be expected to distort the original pulse. This distortion, which is correctable, is a function of the original pulse width and shape, and of the bandwidth of the circuits through which the pulse travels. It is also a function of the design of the electron gun. In FIGURE 9 a distorted wave shape is illustrated that might result from passing a rectangular pulse through circuits with inadequate bandwidth. By use of shaping circuits, Schmitt triggers, blocking oscillators, multi-vibrators, etc., it is possible to reshape or restore the distorted waveform. It is also possible to use these circuits, in conventional manner, to derived pulses of different widths. Thus, the leading edge of a distorted pulse is shown at 96, the trailing edge at 92; using a Schmitt trigger and by biasing at 94 it is possible to re-create a rectangular pulse with a duration "$t$."

An alternate method of shaping the index pulse resides in varying the width of the index generating strip on the target screen; subsequent shaping of the individual gating pulses can be achieved by conventional circuitry such as noted above.

Before concluding, the following review is in order. Assume, first, that the target screen has three equal width color strips. Then, with an excitation period of $t$ ($T/3$), 33% of the screen is usable with a non-linearity between index strips of $\pm 10\%$. This incremental non-linearity can be reduced so that more of the screen area can be used. But even accepting this degree of non-linearity, it is shown (in FIGURE 6) that the screen area which is used can be increased substantially by controlling the first pulse derived from the index signal to have an excitation period of 2⅓t rather than t; and it is shown (in FIGURE 7) that the useful screen area can be increased still further by a factor of two (2) for a given color, by increasing the width of the "last" color producing strip by only 33%. These features combined make it possible, even in the presence of a 10% non-linear scan, to make effective use of 60% of the target screen area. This percentage is obtained by using pulse widths of 2⅓t, 1⅔t, and 2t (a total of 6t) on a target screen where the red strip has a width of 3t, the blue strip 3t, and the green strip is 4t (a total of 10t). As a generality then, advantage is obtained in broadening the excitation interval at the start of a pulse train and making the later derived excitation intervals successively more narrow; and in successively broadening the width of the individual strips in the direction of scan so that the strip to be excited by the initial pulse in a given train is relatively narrow in comparison to those which are to be excited by pulses which follow in the train. Clearly, these arrangements efficiently utilize (1) the scanned area of a cathode ray tube and (2) the emission current of the C.R.T. gun.

Having thus described my invention, I claim:

1. Color television image reproduction apparatus which comprises: a cathode ray tube kinescope having a target screen made up of a plurality of groups of vertically oriented strip-like elements of respectively different color light emitting characteristics and means for producing and directing an electron beam toward said screen; deflection means associated with said kinescope for causing said beam to scan a raster pattern on said screen; said raster comprising a plurality of horizontal line scansions separated vertically from each other; modulating means coupled to said kinescope for modulating the intensity of said electron beam sequentially, into a train of pulses, with video signals respectively representative of said different color characteristics, said train of pulses being developed to have one pulse thereof associated with each of said strip-like color emitting elements; means operatively associated with said kinescope for deriving a series of electromagnetic index signals therefrom indicative of the position of said beam with respect to said screen; means for producing a number of differently timed control pulses from said index signals; means coupled between said last-named means and said modulating means for applying said control pulses to said modulating means; said kinescope index signal-deriving means, control pulse-producing means, pulse-applying means, said modulating means, and said kinescope forming a feedback loop having an inherent time delay; and delay means interposed in series in said loop, said delay means having a time delay approximately equal to the time required for said beam to make one small part of a line scansion minus said inherent time delay, said small part of a scansion considered to be in the order of the width of three consecutive strip-like color emitting elements, whereby the overall delay in the feedback loop is reduced to a minimum.

2. Color television image reproducing apparatus which comprises: a cathode ray tube kinescope having a target screen made up of a plurality of parallel strip-like elements of respectively different color light emitting characteristics and index signal generating elements associated therewith for generating electromagnetic index signals in response to electron impingement and means for producing and directing an electron beam toward said screen; deflection means associated with said kinescope for causing said beam to scan a raster on said screen, said raster comprising a plurality of line scansions across said strip-like elements; modulating means associated with said kinescope for modulating the intensity of said electron beam sequentially, into a train of pulses, with video signals representative of the colors of an image being reproduced; said pulses being modulated to excite less than the full width of said strip-like elements; means operatively associated with said kinescope for deriving pulse-like index signals therefrom bearing information indicative of the position of said beam with respect to said screen; means for applying said index signals to said modulating means for controlling said modulating means; and means for delaying the passage of signals from said index signal deriving means to said controlling means by a period of time which is less than that required for the electron beam to traverse three of said strip-like elements.

3. An apparatus in accordance with claim 2 wherein said modulating means shapes the train of pulses so that the first pulse derived from a given index signal has a greater duration than pulses later derived.

4. An apparatus in accordance with claim 2 wherein at least some of said strip-like elements which emit different colors have different widths, and wherein said modulating means shapes the train of pulses so that at least some pulses of the electron beam have a duration which is proportional to the width of the strip upon which they are to impinge.

5. Color television image reproducing apparatus which comprises: a cathode ray tube kinescope having a target screen made up of a plurality of parallel strip-like elements of respectively different color light emitting characteristics and means for producing and directing an electron beam toward said screen; deflection means associated with said kinescope for causing said beam to scan a raster on said screen, said raster comprising a plurality of line scansions across said strip-like elements; said line scansions having a forward sweep portion and a flyback portion; means associated with said kinescope for modulating the intensity of said electron beam sequentially, into a train of pulses, with video signals representative of the colors of an image being reproduced; said pulses being modulated to excite less than the full width of said strip-like elements; means operatively associated with said kinescope for deriving pulse-like electromagnetic index signals therefrom bearing information indicative of the position of said beam with respect to said screen; means for applying said index signals to said modulating means for controlling said modulating means; said index signal deriving means, said signal applying means, said modulating means, and said kinescope having inherent time delays; and means for delaying the passage of signals from said index signal deriving means to said controlling means by a period of time which is approximately equal to that required for the electron beam to traverse between three and six of said strip-like elements less the sum of said inherent time delays.

6. An apparatus in accordance with claim 5 wherein said means for applying said index signal to said modulating means provides approximately three pulses in said train of pulses for each pulse-like index signal derived during the forward sweep.

7. An apparatus in accordance with claim 6 wherein the first pulse in said train of pulses is shaped to have a greater duration than at least one other pulse in said train of pulses.

8. An apparatus in accordance with claim 5 wherein the stripe-like elements having a selected color emitting characteristic are wider than the others, and wherein the pulse in said train of pulses intended to impinge upon said wider element is shaped to have a greater duration than at least one other pulse in said train of pulses.

9. A system for displaying a plurality of colors comprising: a cathode ray tube having an electron gun for providing an electron beam, a display screen with repeating groups of strip-like elements which generate different colors when traversed by the electron beam, and electron-beam indexing means; means for scanning the electron beam across the strip-like elements; a switching arrangement to gate periodically modulating-information applied to the gun of said cathode ray tube thereby to provide sequential pulses of said electron beam; detection means that provide indexing pulses when the electron beam of said cathode ray tube impinges upon said beam indexing means; means that generate a number of pulses from said indexing pulses, said last-mentioned pulses being applied to operate said switching arrangement; and pulse-shaping means that (1) provide the sequential pulses of the electron beam with individual pulses that effectively have a duration in time less than the time required for the electron beam to traverse the strip-like element upon which the given pulse is to impinge, and that (2) provide the earliest of said sequential pulses derived from a given indexing pulse with a longer duration than a pulse later in the sequence.

10. A viewing apparatus comprising: a directed ray tube having an ordered distribution of materials which emit electromagnetic radiation when bombarded by a scanning beam, means for detecting at least a portion of said emitted electromagnetic radiation which means produce pulses; a pulse amplifier; a first pulse delay arrangement, the output of said delay arrangement being connected to operate switches sequentially in time; the input to said switches being derived from sources containing the information to be viewed; the output of said switches being connected to control the scanning beam thereby to produce a train of pulses of the electron beam; and a second pulse delay arrangement to shift in time said train of pulses, the second delay arrangement being connected in series with a loop comprising said radiation detecting means, amplifier, first pulse delay arrangement, switches, and scanning beam; including means for shaping said train of pulses so that the earliest pulse in the train has a greater duration than a later pulse in the train.

11. A color television viewing apparatus comprising: a directed ray tube having an ordered distribution of substantially vertical strips of materials which fluoresce in different colors when bombarded by a scanning beam which scans said strips at substantially right angles thereto, strips of a selected color having a width different from the strips of the other color producing materials; an electromagnetic radiation emitter which emits a second electromagnetic radiation when bombarded by said scanning beam disposed in ordered relationship to said strips; said second electromagnetic radiation being substantially different from that emitted by the color producing strips; means to detect said second electromagnetic radiation thereby to produce timing pulses; a first timing pulse delay arrangement; the outputs of said delay arrangement being connected to operate switches; the input to said switches being derived from sources containing the information representative of the image to be presented; the output of said switches being connected to control the scanning beam thereby to produce a train of pulses thereof; a second pulse delay arrangement to shift in time said train of pulses, said second delay arrangement being connected in series with a loop comprising the said radiation detecting means, the first pulse delay arrangement, switches, and scanning beam; including pulse shaping means which modulates the pulses in said train of pulses so that the last pulse thereof derived from a given timing pulse will leave unexcited a region of the color emitting strip upon which it is to impinge, said unexcited region being larger for the last pulse and its associated strip than for an earlier pulse and its associated strip.

12. A method for the reproduction of images in substantially their natural color, comprising the steps of developing an image forming scanning beam; forming a scanning raster with said scanning beam; forming repeating, adjacently positioned groups of adjacently positioned strip-like sections of component color areas, and wherein each group of sections includes a pulse forming member; controlling the intensity of said scanning beam to provide a sequential train of pulses thereof after selectively switching different component color image signals in synchronism with the scanning action of said scanning beam on said strip-like sections of component color reproducing areas; developing timing pulses from said scanning action; applying said timing pulses to control said switching process; causing the output of said switching process to be delayed thereby to generate and keep in registration said sequential train of pulses; and shaping the sequential train of pulses so that the first pulse thereof, derived from a given timing pulse, is made wider than the last pulse in that sequential train.

13. A method for the reproduction of images in substantially their natural color, comprising the steps of developing an image forming scanning beam; deflecting said scanning beam across repeating, adjacently positioned groups of adjacently positioned strip-like sections of component color and index signal reproducing areas, said color producing strips being of different widths for some of the colors; forming a pulse each time said scanning beam traverses a group of said strip-like sections; controlling the intensity of said scanning beam to provide a sequential train of pulses thereof after selectively switching different component color image signals in synchronism with the scanning action of said scanning beam on said strip-like sections; developing timing pulses from said scanning action; applying said timing pulses to control said switching process; causing the output of said switching process to be delayed thereby to generate and keep in registration said sequential train of pulses; and shaping the sequential train of pulses so that the first pulse thereof, derived from a given timing pulse, is made wider with respect to the strip-like section with which it is associated than is the case for the last pulse in that sequential train.

References Cited by the Examiner

UNITED STATES PATENTS

| | | | |
|---|---|---|---|
| 2,545,325 | 3/51 | Weimer | 313—92.5 X |
| 2,633,547 | 3/53 | Law | 313—92.5 |
| 2,789,156 | 4/57 | Arneson | 178—5.4 |
| 2,802,964 | 8/57 | Jesty | 313—92.5 |

DAVID G. REDINBAUGH, *Primary Examiner.*

RALPH G. NILSON, STEPHEN W. CAPELLI, *Examiners.*